(12) United States Patent
McKay et al.

(10) Patent No.: US 12,244,015 B2
(45) Date of Patent: Mar. 4, 2025

(54) THIN-FILM ALL-ORGANIC ELECTROCHEMICAL DEVICE

(71) Applicant: Orca Sciences, LLC, Kirkland, WA (US)

(72) Inventors: Ian Salmon McKay, Seattle, WA (US); Lowell Lincoln Wood, Jr., Bellevue, WA (US)

(73) Assignee: Orca Sciences, LLC, Kirkland, WA (US)

( * ) Notice: Subject to any disclaimer, the term of this patent is extended or adjusted under 35 U.S.C. 154(b) by 391 days.

(21) Appl. No.: 17/693,370

(22) Filed: Mar. 13, 2022

(65) Prior Publication Data

US 2022/0311002 A1 Sep. 29, 2022

Related U.S. Application Data

(60) Provisional application No. 63/166,444, filed on Mar. 26, 2021.

(51) Int. Cl.
| | |
|---|---|
| *H01M 4/60* | (2006.01) |
| *C08F 38/02* | (2006.01) |
| *H01M 10/058* | (2010.01) |
| *H01M 50/414* | (2021.01) |

(52) U.S. Cl.
CPC ............. *H01M 4/602* (2013.01); *C08F 38/02* (2013.01); *H01M 10/058* (2013.01); *H01M 50/414* (2021.01); *C08F 2810/00* (2013.01)

(58) Field of Classification Search
CPC ................. H01M 4/602; C08F 38/02
See application file for complete search history.

(56) References Cited

FOREIGN PATENT DOCUMENTS

CN 105070919 A * 11/2015

OTHER PUBLICATIONS

D. Abagli, Well-Defined Redox-Active Polymers and Block Copolymers, J. Am. Chem. Soc. 114, 4150 (1992).
Kuramoto et al., Ferrocene as an effective initiator for copolymerization of styrene with maleic anhydride, J. Pol. Sci. A 33, 967 (1995).
Denisov et al. Mechanism of Inhibiting Action of Quinones in Oxidizing Polymers and Model Compounds, Macromol. Symp. 143, 65-74 (1999).
Hale et al. Electrical Communication Between Glucose Oxidase and Novel Ferrocene-Containing Siloxane-Ethylene Oxide Copolymers: Biosensor Applications, An. Letters 26, 1-16, (2006).
Mahouche-Chergui et al., Aryl diazonium salts: a new class of coupling agents for bonding polymers, biomacromolecules and nanoparticles to surfaces. Chem. Soc. Rev., 40, 4143-4166 (2011).

(Continued)

*Primary Examiner* — Stephan J Essex
(74) *Attorney, Agent, or Firm* — Danielson Legal LlC (57) ABSTRACT

A thin-film all-organic electrochemical device is disclosed. The device includes one or more polymer chains. Each of the one or more polymer chains has reducing functional groups, oxidizing functional groups, and ionically conducting functional groups. The ionically conducting functional groups are disposed in between the reducing functional groups and the oxidizing functional groups. The device may produce a potential greater than 5 volts.

21 Claims, 7 Drawing Sheets

(56) References Cited

OTHER PUBLICATIONS

Jaffe et al., Quinone-Functionalized Carbon Black Cathodes for Lithium Batteries with High Power Densities, Chem. Mater, 27, 3568-3571 (2015).

Huskinson et al., A metal-free organic-inorganic aqueous flow battery, Nature 505, 195 (2014).

Gagne et al., Ferrocene as an internal standard for electrochemical measurements, Inorg. Chem., 9, 19 (1980).

Su et al., Synthesis of a novel ferrocene-contained polypyrrole derivative and its performance as a cathode material for Li-ion batteries, Electrochimica Acta, 104, 302-307, (2013).

Nederstedt et al., Single-ion conducting polymer electrolytes with alternating ionic mesogen-like moieties Interconnected by poly(ethylene oxide) segments, Polymer, 177, 231-240 (2019).

Chen et al., Single-Molecule Charge Transport through Positively Charged Electrostatic Anchors, J. Am. Chem. Soc. 2021, 143, 2886-2895.

\* cited by examiner

THIN-FILM ALL-ORGANIC ELECTROCHEMICAL DEVICE

CROSS-REFERENCE TO RELATED APPLICATIONS

This application claims the benefit of and priority to U.S. Provisional Patent Application No. 63/166,444, filed Mar. 26, 2021, the entire disclosure of which is hereby incorporated by reference as if set forth in its entirety herein

TECHNICAL FIELD

The present application relates generally to an electrochemical device and, more particularly but not exclusively, to a thin-film all-organic electrochemical device.

BACKGROUND

The relevant reaction and transport phenomena in electrochemical devices i.e. batteries occur on sub-nanometer scales, but battery cells are typically fabricated with techniques that result in multi-micron or even millimeter feature sizes. As a result, existing batteries, feature significant "dead weight" in the form of an electrolyte, separators, current collectors, and cell dividers that reduce the energy density of the batteries to a fraction of their theoretical potential, while not contributing to their energy storage or power-delivery capabilities. Furthermore, the transport of ions through μm or mm-scale battery electrolyte layers or physical separators limits the peak power that batteries can deliver to a well-matched load to far less than the theoretical capability.

Therefore, there is a need for an electrochemical device that is constructed with characteristic dimensions that match the scales of the phenomena involved.

The techniques of polymer chemistry are capable of building features on the same length scales as electrochemical reactions and transport phenomena. A battery constructed with these techniques might outstrip the power delivery capabilities of any other battery known.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, a thin-film all-organic electrochemical device is disclosed. The device includes one or more polymer chains. Each of the one or more polymer chains has reducing functional groups, oxidizing functional groups, and ionically conducting functional groups.

In some embodiments the ionically conducting functional groups are disposed in between the reducing functional groups and the oxidizing functional groups.

In some embodiments the reducing functional groups are clustered at a first end and the oxidizing functional groups are clustered at a second end of the device.

In some embodiments the oxidizing functional groups comprise at least one of ferrocene, ethyl viologen, oxoammonium, lignin or PEDOT.

In some embodiments the reducing functional groups comprise at least one of anthraquinone, methyl viologen, polyimide, diselenide, cobaltocenium, polysulfides, disulfides, or PEDOT.

In some embodiments the ionically conducting functional groups comprise polyethylene oxide with dissolved alkali cations, sulfonyl pendant groups, phosphate pendant groups, or alkali cation pendant groups.

In some embodiments the one or more polymer chains are immersed in a liquid electrolyte, wherein the electrolyte comprises at least one ion that interacts with the reducing functional groups, the oxidizing functional groups, and/or the ionically conducting functional groups. The electrolyte may be an air-based electrolyte or a liquid electrolyte.

In some embodiments the one or more polymer chains are attached to current collectors at a first end and at a second end. The current collectors may be aluminum foil, copper foil, graphite-coated aluminum foil, graphite-coated copper foil.

In some embodiments the reducing functional groups, the ionically conducting functional groups and the oxidizing functional groups are ordered in a repeating sequence along a length of each of the one or more of the polymer chains.

In some embodiments the device is configured to produce a potential greater than 5 volts.

In another aspect, a thin-film all-organic electrochemical device is described. The device includes a plurality of polymer chains. Each of the plurality of the polymer chains includes a number of subunits, and each subunit has reducing functional groups, oxidizing functional groups, ionically conducting, and/or conjugated electron-conducting functional groups.

In some embodiments the conjugated electron-conducting groups are polyacetylene, polyaniline, polypyrrole, polythiophene, or polyfuran.

In some embodiments the reducing functional groups, the ionically conducting functional groups, the oxidizing functional groups, and the electron-conducting functional groups in the subunit are ordered in a repeating sequence along a length of each of the plurality of the polymer chains.

In some embodiments the plurality of the polymer chains comprises m number of polymer chains, and each of the plurality of the polymer chains comprises n subunits, wherein m>>n>1.

In some embodiments the polymer chains are immersed in an electrolyte containing at least one ion that interacts with the reducing functional groups, oxidizing functional groups, and/or ionically conducting functional groups.

In yet another aspect, a thin-film all-organic electrochemical device is described. The device includes a plurality of polymer chains. Each of the plurality of the polymer chains includes reducing functional groups, mixed ion/electron conducting functional groups, oxidizing functional groups, and ionically conducting but electrically insulating functional groups.

In some embodiments the ionically conducting but electrically insulating functional groups are disposed in between the reducing functional groups and the oxidizing functional groups.

In some embodiments the device is configured to produce a potential greater than 5 volts.

BRIEF DESCRIPTION OF DRAWINGS

Non-limiting and non-exhaustive embodiments of the invention are described with reference to the following figures, wherein like reference numerals refer to like parts throughout the various views unless otherwise specified.

Further, persons skilled in the art to which this disclosure belongs will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those of ordinary skill in the art having the benefit of the description herein.

DETAILED DESCRIPTION

For the purpose of promoting an understanding of the principles of the disclosure, reference will now be made to the embodiment(s) illustrated in the figures and specific language will be used to describe them. It will nevertheless be understood that no limitation of the scope of the disclosure is thereby intended. Such alterations and further modifications to the disclosure, and such further applications of the principles of the disclosure as described herein being contemplated as would normally occur to one skilled in the art to which the disclosure relates are deemed to be a part of this disclosure.

It will also be understood by those skilled in the art that the foregoing general description and the following detailed description are exemplary and explanatory of the disclosure and are not intended to be restrictive thereof.

The terms "comprises," "comprising," or any other variations thereof, are intended to cover a non-exclusive inclusion, such that a process or method that comprises a list of steps does not include only those steps but may include other steps not expressly listed or inherent to such a process or a method. Similarly, one or more devices or sub-systems or elements or structures or components preceded by "comprises . . . a" does not, without more constraints, preclude the existence of other devices, other sub-systems, other elements, other structures, other components, additional devices, additional sub-systems, additional elements, additional structures, or additional components. Appearances of the phrase "in an embodiment," "in another embodiment" and similar language throughout this specification may, but do not necessarily, all refer to the same embodiment.

Unless otherwise defined, all technical and scientific terms used herein have the same meaning as commonly understood by one of ordinary skill in the art to which this disclosure belongs. The system, methods, and examples provided herein are illustrative only and not intended to be limiting.

Embodiments of the present disclosure will be described below in detail with reference to the accompanying figures.

Batteries are mechanical devices with separate anodes, cathodes, electrolytes, and current collectors. The present disclosure integrates separate functional groups along polymer chains as different components of a battery to produce an ultracompact thin-film electrochemical device that has energy density comparable to Li-ion cells and improved power density, higher working voltages, and longer cycle lives.

Figure 1:
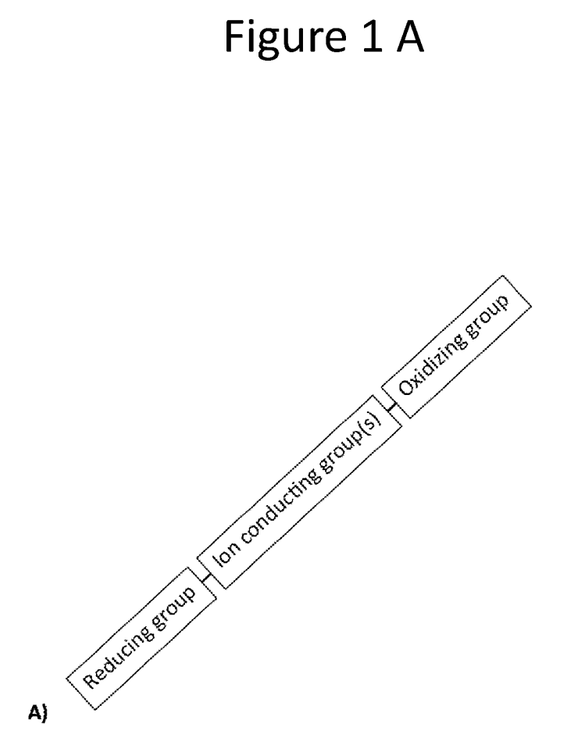
FIG. 1A is a schematic representation of a single molecule battery in accordance with an embodiment of the present disclosure.
FIG. 1B is a schematic representation of an ordered film of single-molecule batteries arranged in parallel between current collectors in accordance with an embodiment of the present disclosure.
FIG. 1C is a schematic representation illustrating m=3 chains each with n repeating subunits in accordance with an embodiment of the present disclosure.

In one embodiment, polymer chemistry techniques are used for molecular-scale assembly of batteries. A fully functional electrochemical cell may be constructed using only a single polymer chain in some embodiments as shown in FIG. 1A. By attaching reversible redox-active end groups with different standard reduction potentials to each end of an ion-conducting polymeric molecule, the polymeric string is made into a single-electron charge-pump. By the assembly of many such charge pumps in parallel on a current-collecting substrate, an extremely compact power source may be created. This thin-film all-organic device may have significant advantages over traditional multicomponent batteries, such as enhanced power density for a given energy density, improved cycle stability (since reactants and separator are integrally attached), and the unique ability to include many cells in series in a single thin-film device of modest spatial scale.

Many potential redox active substituents and ion-conductive central chains may be adapted to fit this strategy. In some embodiments a short polyethylene oxide chain (PEO) may be synthesized with both ferrocene (FC) and anthraquinone (AQ) terminal groups. This chain may then be covalently attached to a graphene substrate (or alternately, adsorbed onto Cu or Ni) at the AQ end to form an oriented film.

Figure 1C:
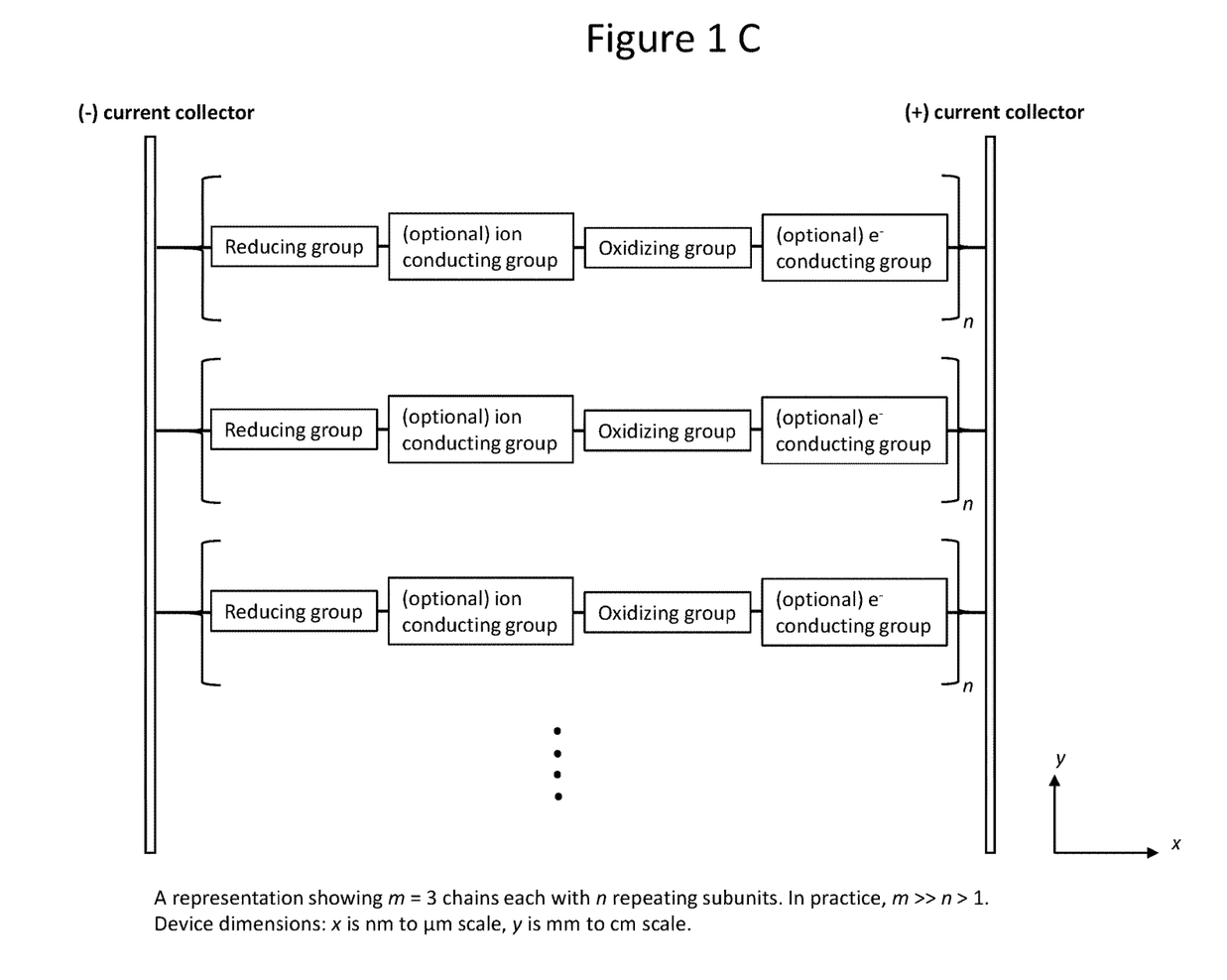

In an embodiment, this polymerization could be accomplished by using a vinyl-ferrocene initiator and AQ terminator in uncontrolled radical polymerization. However, uncontrolled radical polymerization may result high molecular weight (MW) polydispersity. A uniform MW is desired so that as many of the polymer chains as possible are in contact with both electrodes, as shown in FIG. 1B and FIG. 1C. Consequently, in some embodiments, a living anionic polymerization of PEO is pursued, followed by post functionalization with FC and AQ in order to achieve more uniform MW in the final film.

In an embodiment, the oxidizing functional groups may be at least one of ferrocene, ethyl viologen, oxoammonium, lignin or PEDOT.

In another embodiment, the reducing functional groups may be at least one of anthraquinone, methyl viologen, polyimide, diselenide, cobaltocenium, polysulfides, disulfides, or PEDOT.

In yet another embodiment, the ionically conducting functional groups may be polyethylene oxide with dissolved alkali cations, sulfonyl pendant groups, phosphate pendant groups, or alkali cation pendant groups.

In an embodiment, the current collectors may be aluminum foil, copper foil, graphite-coated aluminum foil, graphite-coated copper foil.

Figure 2:
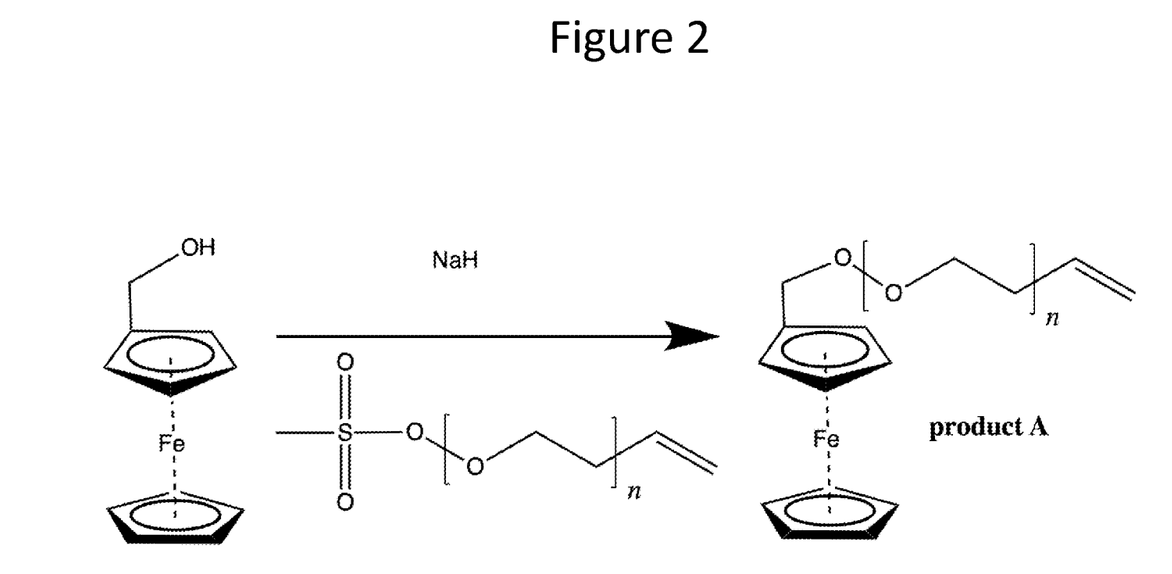
FIG. 2 illustrates creating ferrocene-terminated PEO chains by functionalization of PEO oligomers subsequent to living anionic polymerization in accordance with an embodiment of the present disclosure.

In an embodiment, synthesis steps for an FC-AC single molecule battery are disclosed. Low PDI PEO is first synthesized via a living anionic polymerization of ethylene oxide in Tetrahydrofuran (THF) using sodium methyl sulfoxide initiator. Subsequently, the polymerized product is purified and redissolved in THF. Ferrocenyl methanol is separately produced by hydroboration and oxidation of vinyl ferrocene in THF/BH3 and H2O2/KOH. The sulfoxide end group on the PEO is then replaced with FC by combining the PEO-sulfoxide with ferrocenyl methanol and NaH in THF to yield product A, as illustrated in FIG. 2.

Figure 3:
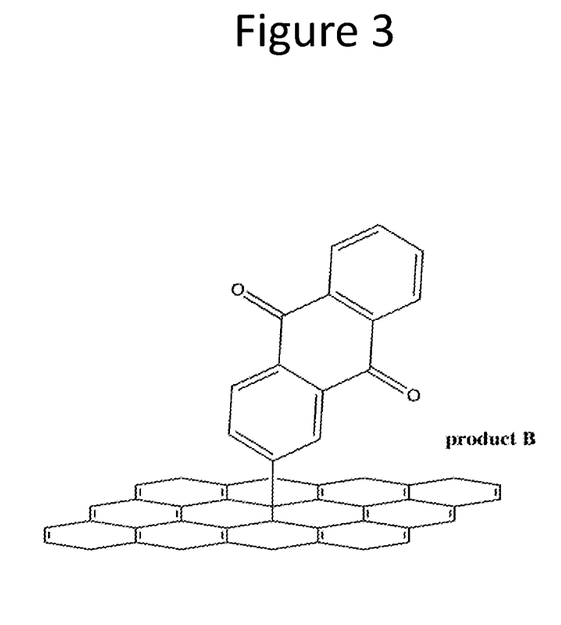
FIG. 3 illustrates covalent attachment of anthraquinone (AQ) onto graphene substrate using an aryldiazonium coupling reaction in accordance with an embodiment of the present disclosure.

Further, AQ is covalently attached to a graphene surface using an aryldiazonium coupling reaction. A diazonium derivative of AQ (PAQ-N2+) is first synthesized from 2-amino-9,10-phenanthrenequinone (PAQ-NH2) through reaction with (NO)PF6 in acetonitrile at −30° C. Subsequently, the graphene is immersed in an acetonitrile solution of (PAQ-N2)PF6 and (Bu4N)PF6 to attach the AQ covalently onto the graphitic sp2 sites to yield product B, as illustrated in FIG. 3.

The terminal vinyl group of product A is subsequently brominated in a CCl4 mixture, and combined with product B in methanol with 0.1 equivalents PdCl2 to achieve a Heck coupling of product A with product B. While this Heck coupling could in theory attack either end of the surface-bound AQ, steric hindrance from the full monolayer of AQ present on the graphene promotes self-assembly of the PEO-FC units into an ordered film.

Figure 4:
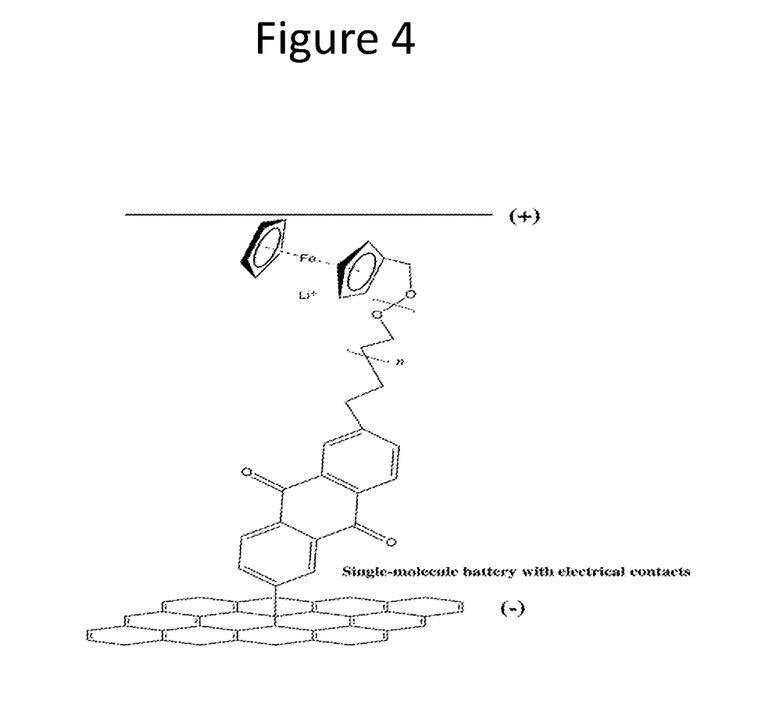
FIG. 4 illustrates a final polymer product between a graphene substrate and positive electrode contact in accordance with an embodiment of the present disclosure.

The coupled product (graphene+AQ/PEO/FC film) may finally be removed from the Heck reaction mixture and placed in a suitable electrolyte in some embodiments. A top electrical contact could be applied in order to test the battery, (either by metal evaporation or application of a conformal conductive carbon paste) to yield the final product, as shown in FIG. 4. The final polymer product is between a graphene substrate and a positive electrode contact.

In one embodiment, the disclosed battery may produce approximately 300 mV when wetted with a mildly acidic aqueous or alcohol electrolyte. In another embodiment, this battery may produce approximately 400 mV. In one embodiment, the disclosed battery may produce 5 volts. The battery based on the Li salt may function at a higher voltage without the quinone unit (i.e., if the FC-PEO chain were attached directly to the graphene, allowing for the more reducing Li-graphite interaction rather than the Li-AQ interaction). This is an example of a 'supramolecular' instead of a 'unimolecular' battery.

In one embodiment, the electrolyte may be aqueous. In some embodiments, the electrolyte may be an air-based electrolyte. In some embodiments, the electrolyte may be a liquid electrolyte.

In another embodiment, extension to multi-cell batteries is disclosed. In such embodiments, the synthesis of a single-molecule power device having not a single electrochemical cell, but many electrochemical cells in series is disclosed. Living polymerization techniques may be employed to allow for the creation of SAMs consisting of polymers composed of four repeating units: a conjugated e-conductor, a reducing agent, an ion conductor, and an oxidizing agent. Arrays of oligomers with tens or hundreds of such units may be used as a thin-film power source with much higher working voltages and energy densities than are achievable in conventional battery systems.

In one embodiment ionomeric conduction may be used. To produce a high voltage, ion conduction must occur exclusively along the polymer chain, without participation from unbound solvent molecules or significant inter-chain movement. If ions are allowed to move freely along the length of the polymer, an ionic shunt pathway exists between all the separate redox units along the chain. The existence and operation of chlorophyll molecular networks in the chloroplasts of plants, in which significantly larger electric fields are routinely photo-generated by sunlight and then successfully manipulated, in the process of 'fixing' the carbon of 'presented' CO2, may be a proof-of-feasibility of such an 'adequately-insulating' arrangement. Conversely, though, electrochemical crosstalk between adjacent chains is not much of a concern, since substituents and the same coordinate along the polymer chain will be at the same chemical potential.

In another embodiment, the energy density may be estimated. The attainable energy density may depend on the polymer chain packing density, the redox potentials of the oxidizing and reducing groups, the fraction of polymer chains making good contact with both current collectors. Further, the energy density may also depend on whether 'inert' polymer strands must be intermixed with the redox-active molecules for structural stability.

In one embodiment, the estimated energy density may be in a range from 10 to 1500 kJ/L. An ordered film prepared with ferrocene and anthraquinone (but linked cell-cell with polyacetylene) may result in net 250 kJ/L. Since energy density is strongly dependent on the polymerization error rate, very high polymerization fidelity must be achieved, especially if high per-device voltage is a goal to be achieved. Polymerization error rate as a function of number of cells is presented in FIG. 5.

The energy density limitations arise because of the fixed ratio of "separator" monomers to "active material" monomers along each polymer chain. Whereas an ordinary mechanically-assembled battery cell may be ~45% anode material by mass, ~45% cathode material, and only ~10% separator material, the all-polymer battery is locked into a 1:1:1:1 anode-cathode-separator-conductor configuration.

This may be circumvented by using mixed ion/electron conducting groups as the redox-active substituent, as shown in FIG. 1C. FIG. 1C includes a representation showing m=3 chains each with n repeating subunits. In practice, m>>n>1. Device dimensions are x in nm to μm scale, y in mm to cm scale.

Higher energy density may be achieved by concatenating multiple mixed ion/electrons conducting redox active groups on each polymer chain, separated by a smaller number (as few as one) of ion conducting groups.

The thin-film electrochemical device may take advantage from the strength of polymer materials, their good dielectric properties and may mitigate the drawback of their relatively lower electronic conductivity by allowing a higher voltage discharge.

Figure 5:
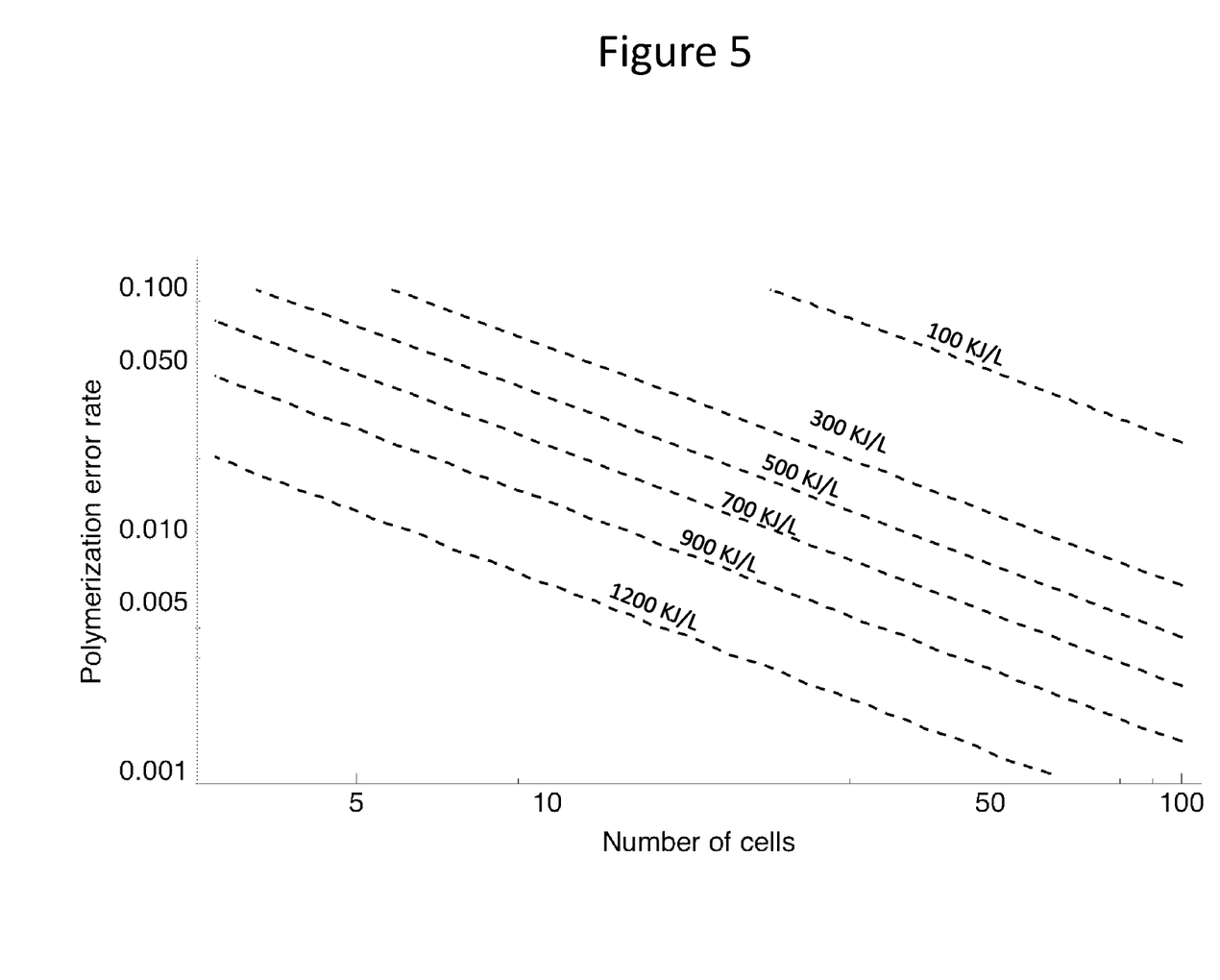
FIG. 5 is a graph illustrating variation of polymerization error rate with number of cells as a function of energy density in accordance with an embodiment of the present disclosure.

In another embodiment, estimating the energy density of a supramolecular power supply is conceptualized in FIG. 5 and presented in Table 1. The impact of polymerization error rate on attainable energy density depends strongly on the number of 'cells' on each chain, and is given here for a 30 cell (15-90V) film. Foil layers between successive films may be inserted to reduce the impact of polymerization errors, but may reduce energy density and increase manufacturing costs. The specific energy estimate in the conservative case may be an overestimate, since at such low chain density the polymer would likely require a supporting scaffold between current collectors.

TABLE 1

|  | Conservative estimate | Expected estimate |
| --- | --- | --- |
| Packing density | $5 \times 10^{12}$ | $4 \times 10^{14}$ |
| Single cell potential | 0.5 V | 3.0 V |
| Chain contact fraction | 0.7 | 0.99 |
| Polymerization error rate | 1% | .001% |
| Oxidizing group MW/VDWV | 200/230 | 78/80 |
| Reducing group MW/VDWV | 200/230 | 70/78 |
| Conducting group MW/VDWV | 26/22 | n/a |
| Ionomer MW/VDWV | 176/156 | 44/39 |
| Energy density | 70 kJ/L | 1180 kJ/L |
| Specific energy | 290 kJ/kg | 1850 kJ/kg |

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A thin-film all-organic electrochemical device, the device comprising:
one or more polymer chains, wherein each of the one or more polymer chains comprises reducing functional groups, oxidizing functional groups, and ionically conducting functional groups.

2. The device of claim 1, wherein the ionically conducting functional groups are disposed in between the reducing functional groups and the oxidizing functional groups.

3. The device of claim 1, wherein the reducing functional groups are clustered at a first end and the oxidizing functional groups are clustered at a second end of the device.

4. The device of claim 1, wherein the oxidizing functional groups comprise at least one of ferrocene, ethyl viologen, oxoammonium, lignin or PEDOT.

5. The device of claim 1, wherein the reducing functional groups comprise at least one of anthraquinone, methyl viologen, polyimide, diselenide, cobaltocenium, polysulfides, disulfides, or PEDOT.

6. The device of claim 1, wherein the ionically conducting functional groups comprise polyethylene oxide with dissolved alkali cations, sulfonyl pendant groups, phosphate pendant groups, or alkali cation pendant groups.

7. The device of claim 1, wherein the one or more polymer chains are immersed in a liquid electrolyte, wherein the electrolyte comprises at least one ion that interacts with the reducing functional groups, the oxidizing functional groups, and/or the ionically conducting functional groups.

8. The device of claim 7, wherein the electrolyte is an air-based electrolyte or a liquid electrolyte.

9. The device of claim 1, wherein the one or more polymer chains are attached to current collectors at a first end and at a second end.

10. The device of claim 9, wherein the current collectors are aluminum foil, copper foil, graphite-coated aluminum foil, graphite-coated copper foil.

11. The device of claim 1, wherein the reducing functional groups, the ionically conducting functional groups and the oxidizing functional groups are ordered in a repeating sequence along a length of each of the one or more of the polymer chains.

12. The device of claim 1, wherein the device is configured to produce a potential in a range of 5-50 volts.

13. A thin-film all-organic electrochemical device, the device comprising:
a plurality of polymer chains, wherein each of the plurality of the polymer chains comprises a number of subunits, wherein each subunit comprises reducing functional groups, oxidizing functional groups, and ionically conducting; functional groups.

14. The device of claim 13 wherein each subunit further comprises conjugated electron-conducting functional groups.

15. The device of claim 14, wherein the reducing functional groups, the ionically conducting functional groups, the oxidizing functional groups, and the electron-conducting functional groups in the subunit are ordered in a repeating sequence along a length of each of the plurality of the polymer chains.

16. The device of claim 13, wherein the conjugated electron-conducting groups are polyacetylene, polyaniline, polypyrrole, polythiophene, or polyfuran.

17. The device of claim 13, wherein the plurality of the polymer chains comprises m number of polymer chains, and each of the plurality of the polymer chains comprises n subunits, wherein m>>n>1.

18. The device of claim 13, wherein the polymer chains are immersed in an electrolyte containing at least one ion that interacts with the reducing functional groups, oxidizing functional groups, and/or ionically conducting functional groups.

19. A thin-film all-organic electrochemical device, the device comprising:
a plurality of polymer chains, wherein each of the plurality of the polymer chains comprises reducing functional groups, mixed ion/electron conducting functional groups, oxidizing functional groups, and ionically conducting but electrically insulating functional groups.

20. The device of claim 19, wherein the ionically conducting but electrically insulating functional groups are disposed in between the reducing functional groups and the oxidizing functional groups.

21. The device of claim 19, wherein the device is configured to produce a potential of 5-50 volts.

* * * * *